United States Patent Office 2,833,662
Patented May 6, 1958

2,833,662

WHEAT AND CORN STARCH ADHESIVES AND METHOD OF MAKING THEM

Levi M. Thomas and Thomas J. Neel, Worthington, and Frank Paul McCombs, Columbus, Ohio, assignors to National Industrial Products Company, a corporation of Ohio No Drawing. Application December 21, 1953
Serial No. 399,644

5 Claims. (Cl. 106—213)

This invention relates to new and useful starch products and new methods for the production thereof. Our derivatives are particularly useful as adhesives for the purpose of making corrugated board.

One usual method of making corrugated board consists of corrugating a strip of paper by means of a corrugated roller, applying an adhesive to the tips of the corrugation on one side, adhering another strip of paper to the tips by heat and under high pressure, applying an adhesive to the opposite tips, and adhering a second strip of paper to said opposite side by heat and under a relatively small amount of pressure. The fact that the use of a great amount of pressure in the adherence of the second strip of paper would tend to crush the corrugations makes the adhesive problem in this step quite difficult. Silicate of soda ahesives were at one time used, but were not entirely satisfactory. More recently gelatinized starches and dextrine were used, but were found unsatisfactory. More recently still, some success has been attained by using a gelatinized starch or flour as a carrier in combination with an ungelatinized starch or flour carried thereby. Such combination of a gelatinized carrier and an ungelatinized potential adhesive has marked advantages over the silicate of soda adhesives, but has heretofore had certain disadvantages.

In the process of making corrugated paper board, the adhesive is circulated to and from pans in which adhesive supplying rolls continually dip as they rotate causing an agitation of the adhesive. This agitation of the adhesive has heretofore had a pronounced and deleterious effect on the viscosity of the adhesive. We have found that gelatinized pearl corn starch loses viscosity when agitated over a comparatively long time and to a relatively great degree. Agitation also causes wheat starch to change in viscosity rapidly and for a considerable time.

We have discovered that by using our new starch derivative the viscosities of both the gelatinized starch which serves as a carrier and the ungelatinized starch which is carried thereby after an initial adjustment period of only about 30 minutes, remain substantially constant at a favorable viscosity for many hours.

We prefer to use our mixture or blend of corn starch and wheat starch both as the carrier and as the ungelatinized carried starch. However, it is essential in our process that the blend be used as the carried portion (i. e. ungelatinized portion) whether said carrier is pearl corn starch, or wheat starch or is a blend of the two or is one or more of other types of starch. It is preferred that the mixture be agitated for about 30 minutes before being led to the pans.

We have found that if the amount of wheat starch in a blend of wheat and corn starch is increased over 52%, the viscosity during stirring varies too much and/or for too long a period to be entirely satisfactory for the purposes desired. On the other hand, we find that if the amount of wheat starch in such a blend is decreased under about 30%, the viscosity during stirring varies too much and/or for too long a period to be entirely satisfactory for the purposes desired.

It is essential in our invention to mix at least about 30 and not more than about 52 parts and preferably about 45 parts of dry raw wheat starch and at least 48 parts and not more than 70 parts of dry raw pearl corn starch. Then we prefer taking a portion of this mixture and mix it with about 10 times the amount of water by weight and about 10–20% alkali. We then heat to gelatinize. We use this as a carrier and we combine with it an aqueous ungelatinized starch which consists of a portion of raw starch taken from the original mixture of about four to six times the original amount taken to form the carrier and of about 1¾ times the amount of water used in the carrier. Thus if we use an average of about five times the amount of starch in the carried portion we will have one part of starch in the carrier together with 10 parts of water by weight and 5 parts of starch in the carried portion together with 17.5 parts of water by weight which is a proportion of starch to water in the carried portion of 1 to 3.5 by weight. We prefer to add about 3–4% of borax to the ungelatinized starch, the percentage being based on the dry starch solids. We then prefer to agitate for thirty minutes before leading to the pans from which the adhesive is applied to the paper.

It is to be understood that the above described embodiments of our invention are for the purpose of illustration only and various changes may be made therein without departing from the spirit and scope of the invention.

We claim:

1. A starch product serving as an adhesive which comprises a gelatinized starch carrier and an aqueous raw starch mixture carried thereby, said aqueous raw starch mixture consisting of about 45 parts by weight of dry raw wheat starch, about 55 parts by weight of dry raw pearl corn starch, about 340 parts by weight of water and about 3% by weight of borax, said percentage of borax being based on the dry starch in said aqueous raw starch mixture.

2. A starch product for use as an adhesive consisting of a gelatinized starch carrier in combination with an aqueous raw starch mixture carried thereby, said aqueous raw starch mixture consisting of about one part by weight of raw starch comprising a mixture of at least 30% and not more than 52% of dry raw wheat starch and at least 48% and not more than 70% of dry pearl raw corn starch and about 3.5 parts by weight of water.

3. In a method of making a starch product in which one portion of raw starch is gelatinized and serves as a carrier and another portion of raw starch is mixed with water and is carried by said carrier and the two portions are subsequently mixed together so that the carrier carries the other portion of starch and so that the carrier portion is partially dried by the other portion of the starch, the improvement which consists of preparing a gelatinized starch as a carrier, mixing from 30 to 52% of dry raw wheat starch and from 48 to 70% of dry raw pearl corn starch, then mixing the wheat-corn starch mixture with water and borax and thereafter mixing a relatively large amount of the raw starch mixture with the gelatinized starch.

4. The method of claim 3 in which the amount of starch in the carried portion is about 5 times the amount of starch in the carrier and the amount of water in the carried portion is about 1¾ times the amount of water in the carrier.

5. A starch product for use as an adhesive consisting of a gelatinized carrier which comprises about 1 part by weight of a mixture of at least 30% and not more than 52% of dry raw wheat starch, at least 48% and not more than 70% of dry raw pearl corn starch, about 10 parts by weight of water and which has been gelatinized in combination with an aqueous raw starch mixture carried thereby, said aqueous raw starch mixture consisting of about 5 parts by weight of a mixture of at least 30% and not more than 52% of dry raw wheat starch and at least 48% and not more than 70% of dry raw pearl corn starch and about 17.5 parts by weight of water.

References Cited in the file of this patent

UNITED STATES PATENTS

| | | |
|---|---|---|
| 2,051,025 | Bauer | Aug. 18, 1936 |
| 2,102,937 | Bauer | Dec. 21, 1937 |
| 2,275,845 | Drake | Mar. 10, 1942 |

FOREIGN PATENTS

| | | |
|---|---|---|
| 526,643 | Great Britain | Sept. 23, 1940 |